(12) United States Patent
Zeng et al.

(10) Patent No.: US 10,448,093 B2
(45) Date of Patent: Oct. 15, 2019

(54) BLUETOOTH ADAPTIVE VOLUME ADJUSTING METHOD AND DEVICE

(71) Applicant: SHENZHEN TCL DIGITAL TECHNOLOGY LTD., Shenzhen, Guangdong (CN)

(72) Inventors: Qingzhong Zeng, Shenzhen (CN); Zhixing Pan, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 16/068,241

(22) PCT Filed: Jun. 3, 2016

(86) PCT No.: PCT/CN2016/084836
§ 371 (c)(1),
(2) Date: Jul. 5, 2018

(87) PCT Pub. No.: WO2017/075988
PCT Pub. Date: May 11, 2017

(65) Prior Publication Data
US 2019/0028762 A1    Jan. 24, 2019

(30) Foreign Application Priority Data
Nov. 5, 2015 (CN) .......................... 2015 1 0750007

(51) Int. Cl.
*H04N 21/4363* (2011.01)
*G06F 3/16* (2006.01)
(Continued)

(52) U.S. Cl.
CPC ....... *H04N 21/43637* (2013.01); *G06F 3/165* (2013.01); *H04N 21/4396* (2013.01); *H04N 21/4852* (2013.01); *H04W 4/80* (2018.02)

(58) Field of Classification Search
CPC ......... H04N 21/43637; H04N 21/4396; H04N 21/4852; H04N 5/60; G06F 3/165;
(Continued)

(56) References Cited

U.S. PATENT DOCUMENTS 6,009,181 A    12/1999  Kim
9,780,750 B2 * 10/2017  Ito ............................ H04N 5/60
(Continued)

FOREIGN PATENT DOCUMENTS

CN    101370106    2/2009
CN    101488783    7/2009
(Continued)

OTHER PUBLICATIONS

International Search Report dated Aug. 24, 2016 from corresponding application No. PCT/CN2016/084836.
(Continued)

*Primary Examiner* — Jason R Kurr
(74) *Attorney, Agent, or Firm* — Hauptman Ham, LLP

(57) ABSTRACT

Provided is a method and device of Bluetooth adaptive volume adjustment. The method includes: obtaining an adjustable maximum volume value of the Bluetooth audio device and a user adjustable maximum volume value, after a smart terminal being connected with a Bluetooth audio device; obtaining a volume value indicated by a volume adjustment instruction, after receiving the volume adjustment instruction; calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, the user adjustable maximum volume value; setting the volume of the Bluetooth audio device according to the
(Continued)

obtained volume value of the Bluetooth audio device, setting the volume of the smart terminal according to the obtained volume value of the smart terminal.

16 Claims, 5 Drawing Sheets

(51) Int. Cl.
  *H04N 21/439* (2011.01)
  *H04N 21/485* (2011.01)
  *H04W 4/80* (2018.01)

(58) Field of Classification Search
  CPC .. H04W 4/80; H03G 3/02; H03G 3/20; H03G 3/3005
  See application file for complete search history.

(56) References Cited

U.S. PATENT DOCUMENTS

| | | | | |
|---|---|---|---|---|
| 2007/0291955 | A1* | 12/2007 | Yamashita | H04R 5/00 381/79 |
| 2008/0058037 | A1 | 3/2008 | Dunn et al. | |
| 2010/0157172 | A1* | 6/2010 | Chen | H04N 5/60 348/738 |
| 2014/0037107 | A1* | 2/2014 | Marino, Jr. | H03G 3/10 381/107 |
| 2015/0293744 | A1* | 10/2015 | Bae | H04N 21/42225 381/105 |

FOREIGN PATENT DOCUMENTS

| | | |
|---|---|---|
| CN | 103546618 | 1/2014 |
| CN | 103731617 | 4/2014 |
| CN | 103916797 | 7/2014 |
| CN | 104484190 | 4/2015 |
| CN | 104660197 | 5/2015 |
| CN | 104935845 | 9/2015 |
| CN | 105392050 | 3/2016 |

OTHER PUBLICATIONS

Office Action dated Mar. 30, 2018 from corresponding application No. CN201510750007.X.

* cited by examiner

BLUETOOTH ADAPTIVE VOLUME ADJUSTING METHOD AND DEVICE

RELATED APPLICATIONS

The present application is a National Phase of International Application Number PCT/CN2016/084836, filed Jun. 3, 2016, and claims the priority of China Application No. 201510750007.X, filed Nov. 5, 2015.

FIELD

The present disclosure relates to the field of television technology, and more particularly to a Bluetooth adaptive volume adjusting method and device.

BACKGROUND

At present, Bluetooth function has become a frequently used function in people's daily life and is widely used in smart phones, smart televisions (TVs) and other terminal devices. Among the devices, Bluetooth speakers and earphones are the Bluetooth audio devices which are much more commonly used, and the most of requirements for the audio devices from users are sound quality and volume. A smart TV of which has a Bluetooth function, its volume adjustment becomes more complicated because the TV itself has a volume adjustment function (only for the Bluetooth channel), and the Bluetooth audio device also has its own volume adjustment switch.

Currently, to the smart TV with Bluetooth function, when being successfully connected with Bluetooth audio device, the Bluetooth volume can be adjusted by: the user adjusting the Bluetooth channel volume of the TV (via a remote control or a keypad's volume up/down). By this adjustment, the volume's gain value controlled by the TV's IC is adjusted, that is, the volume of the sound sent out by the TV is adjusted. If the volume of the Bluetooth audio device at this time is very small, there will be a limit to the volume change of adjusting the TV, and the range of volume change is small, so the user further needs to manually adjust the volume of the Bluetooth audio device, which results in a poor user experience.

In addition, the above-mentioned volume adjustment method still has a defect: when the volume of the Bluetooth audio device is at the maximum value (max), after the TV is connected to the Bluetooth audio device, adjusting the volume gain of the TV through the volume key is prone to cause a distortion.

SUMMARY

The present disclosure is to provide a Bluetooth adaptive volume adjusting method and device, which aims at adjusting the volume of a smart terminal (such as a TV) and a Bluetooth terminal at the same time, so as to achieve a smooth and uniform volume adjustment effect, and to solve the problems of Bluetooth volume adjustment such as distortion, small variation in volume adjustment in the prior art.

In order to achieve the above aim, the present disclosure provides a Bluetooth adaptive volume adjusting method, which includes:

obtaining an adjustable maximum volume value of a Bluetooth audio device and a user adjustable maximum volume value, after a smart terminal being connected with the Bluetooth audio device;

obtaining a volume value indicated by a volume adjustment instruction, after receiving the volume adjustment instruction;

calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, and the user adjustable maximum volume value; and setting the volume of the Bluetooth audio device according to the obtained volume value of the Bluetooth audio device, setting the volume of the smart terminal according to the obtained volume value of the smart terminal;

a formula for calculating the volume value of the Bluetooth audio device according to the volume value indicated by the volume adjustment instruction, the adjustable maximum volume value of the Bluetooth audio device, and the user adjustable maximum volume value being as follows:

$$B'_{Volc} = \frac{lg(1 + Vol_C)}{lg(1 + Vol_{max})} * B_{Volmax};$$

in which $Vol_c$ is the volume value indicated by the volume adjustment instruction;

$Vol_{max}$ is the user adjustable maximum volume value;

$B_{Volmax}$ is the adjustable maximum volume value of the Bluetooth audio device.

Preferably, prior to the block of "setting the volume of the Bluetooth audio device according to the obtained volume value of the Bluetooth audio device, setting the volume of the smart terminal according to the obtained volume value of the smart terminal", further includes:

determining whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

Preferably, the method further includes:

when receiving the volume adjustment instruction from user again, returning to perform the block of: obtaining the volume value indicated by the volume adjustment instruction.

Preferably, the block of "setting the volume of the Bluetooth audio device according to the obtained volume value of the Bluetooth audio device, setting the volume of the smart terminal according to the obtained volume value of the smart terminal" includes:

invoking TV_Set_Volume_Gain, and setting the volume of the smart terminal according to the obtained volume value of the smart terminal; invoking Send_BT_Volume, and setting the volume of the Bluetooth audio device according to the obtained volume value of the Bluetooth audio device.

The present disclosure also provides a Bluetooth adaptive volume adjusting method, which includes:

obtaining an adjustable maximum volume value of a Bluetooth audio device and a user adjustable maximum volume value, after a smart terminal being connected with the Bluetooth audio device;

obtaining a volume value indicated by a volume adjustment instruction, after receiving the volume adjustment instruction;

calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, and the user adjustable maximum volume value; and setting the volume of the Bluetooth audio device according to the obtained volume value of the Bluetooth audio device, setting the volume of the smart terminal according to the obtained volume value of the smart terminal.

Preferably, prior to the block of "setting the volume of the Bluetooth audio device according to the obtained volume value of the Bluetooth audio device, setting the volume of the smart terminal according to the obtained volume value of the smart terminal", further including:

determining whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

Preferably, the method further including:

when receiving the volume adjustment instruction from user again, returning to perform the block of: obtaining the volume value indicated by the volume adjustment instruction.

Preferably, a formula for calculating the volume value of the smart terminal according to the volume value indicated by the volume adjustment instruction is as follows:

$$Vol_{Gc}=k*Vol_c;$$

$Vol_c$ is the volume value indicated by the volume adjustment instruction;

$Vol_{Gc}$ is the volume value of the smart terminal;

k is a slope factor;

a formula for calculating the volume value of the Bluetooth audio device according to the volume value indicated by the volume adjustment instruction, the adjustable maximum volume value of the Bluetooth audio device, and the user adjustable maximum volume value is as follows:

$$B'_{Volc} = \frac{lg(1 + Vol_C)}{lg(1 + Vol_{max})} * B_{Volmax};$$

$Vol_c$ is the volume value indicated by the volume adjustment instruction;

$Vol_{max}$ is the user adjustable maximum volume value;

$B_{Volmax}$ is the adjustable maximum volume value of the Bluetooth audio device.

Preferably, the block of "setting the volume of the Bluetooth audio device according to the obtained volume value of the Bluetooth audio device, setting the volume of the smart terminal according to the obtained volume value of the smart terminal" includes:

invoking TV_Set_Volume_Gain, and setting the volume of the smart terminal according to the obtained volume value of the smart terminal; invoking Send_BT_Volume, and setting the volume of the Bluetooth audio device according to the obtained volume value of the Bluetooth audio device.

The present disclosure also provides a Bluetooth adaptive volume adjusting device, which includes:

a first obtaining module, configured to obtain an adjustable maximum volume value of a Bluetooth audio device and a user adjustable maximum volume value after a smart terminal being connected with the Bluetooth audio device;

a second obtaining module, configured to obtain a volume value indicated by a volume adjustment instruction after receiving the volume adjustment instruction;

a calculation module, configured to calculate a volume value of the smart terminal according to the volume value indicated by the volume adjustment instruction, and to calculate a volume value of the Bluetooth audio device according to the volume value indicated by the volume adjustment instruction, the adjustable maximum volume value of the Bluetooth audio device, and the user adjustable maximum volume value; and a setting module, configured to set the volume of the Bluetooth audio device according to the obtained volume value of the Bluetooth audio device, and to set the volume of the smart terminal according to the obtained volume value of the smart terminal.

Preferably, the device further includes:

a determining module, configured to determine whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

Preferably, the second obtaining module is further configured to obtain the volume value indicated by the volume adjustment instruction again when receiving the volume adjustment instruction from user once more.

Preferably, a formula for calculating the volume value of the smart terminal according to the volume value indicated by the volume adjustment instruction is as follows:

$$Vol_{Gc}=k*Vol_c;$$

$Vol_c$ is the volume value indicated by the volume adjustment instruction;

$Vol_{Gc}$ is the volume value of the smart terminal;

k is a slope factor;

a formula for calculating the volume value of the Bluetooth audio device according to the volume value indicated by the volume adjustment instruction, the adjustable maximum volume value of the Bluetooth audio device, and the user adjustable maximum volume value is as follows:

$$B'_{Volc} = \frac{lg(1 + Vol_C)}{lg(1 + Vol_{max})} * B_{Volmax};$$

$Vol_c$ is the volume value indicated by the volume adjustment instruction;

$Vol_{max}$ is the user adjustable maximum volume value;

$B_{Volmax}$ is the adjustable maximum volume value of the Bluetooth audio device.

Preferably, the setting module is al so configured to invoke TV_Set_Volume_Gain, and set the volume of the smart terminal according to the obtained volume value of the smart terminal; and configured to invoke Send_BT_Volume, and set the volume of the Bluetooth audio device according to the obtained volume value of the Bluetooth audio device.

In the present disclosure, the adjustable maximum volume value of the Bluetooth audio device and the user adjustable maximum volume value are obtained, after the smart terminal being connected with the Bluetooth audio device; the volume value indicated by the volume adjustment instruction is obtained, after receiving the volume adjustment instruction; the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, and the user adjustable maximum volume value; and the volume of the Bluetooth audio device is set according to the obtained volume value of the Bluetooth audio device, the volume of the smart terminal is set according to the obtained volume value of the smart terminal. Thus, through the above scheme, adaptive Bluetooth volume value adjustment of both ends are achieved, the volume gain value of the television and the volume of the Bluetooth can be adjusted simultaneously and uniformly through volume keys of remote control or adjusting volume keys of the television by the user, thereby realizing a smooth and uniform volume adjustment effect, and thus the problems of Bluetooth volume adjustment such as distortion, small variation in volume adjustment in the prior art are solved, user experience is improved and the competitiveness of user product is improved.

Various implementations, functional features, and advantages of the present disclosure will now be described in further detail with reference to the accompanying drawings and some illustrative embodiments.

DETAILED DESCRIPTION OF THE EMBODIMENTS

Figure 1:
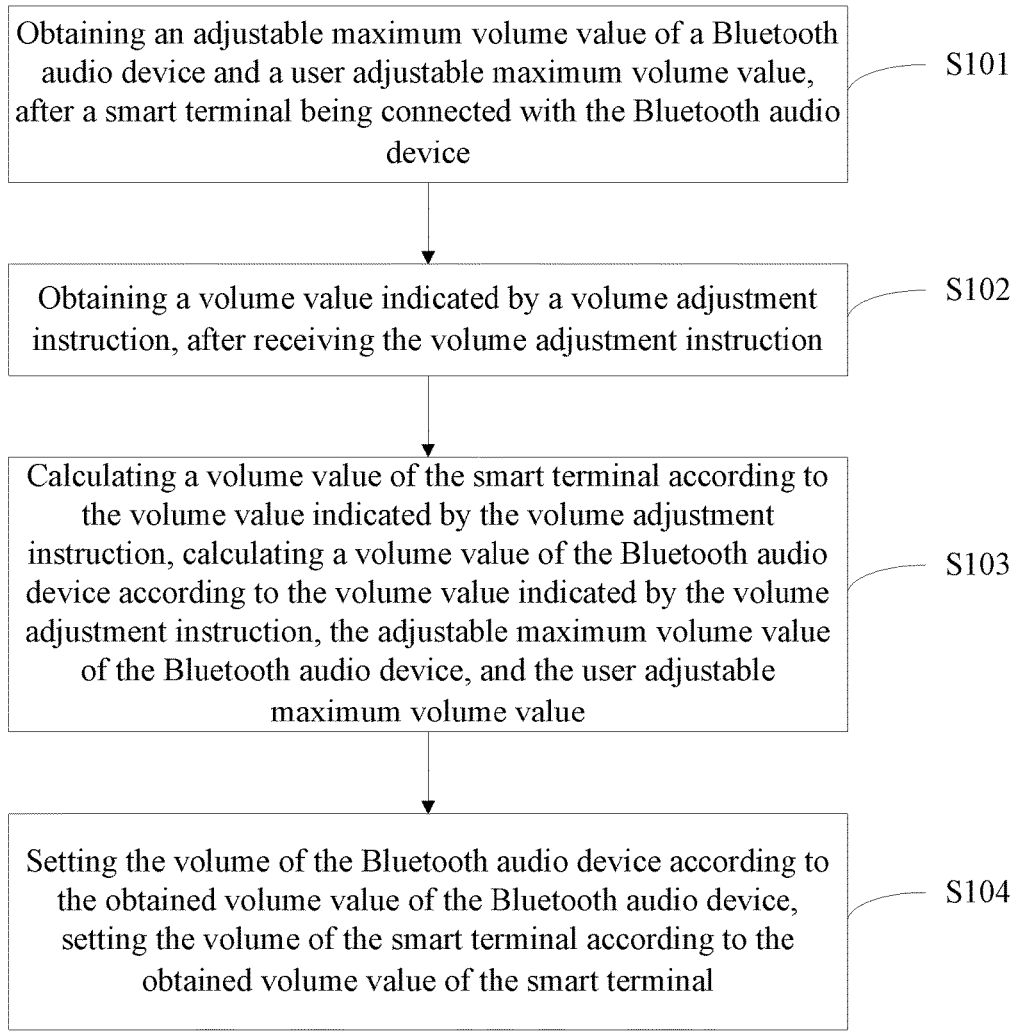
FIG. 1 is a flow chart illustrating a Bluetooth adaptive volume adjusting method according to a first embodiment of the present disclosure.

Referring to FIG. 1, the present disclosure provides a Bluetooth adaptive volume adjusting method, which includes:

S101, obtaining an adjustable maximum volume value of a Bluetooth audio device and a user adjustable maximum volume value, after a smart terminal being connected with the Bluetooth audio device;

The solution in the embodiment is applicable to an audio playback device using a standard Bluetooth protocol, wherein the smart terminal may be a terminal having audio and video playback functions such as a smart television (TV), an mp3, and a mobile phone. The smart TV is used as an example in this embodiment.

The standard Bluetooth A2dp protocol, the Bluetooth audio device is the SNK (audio sink device), and the TV is the source (audio source device).

Currently, to the smart TV with Bluetooth function, when being successfully connected with Bluetooth audio device in the methods of adjusting Bluetooth volume, if the volume of the Bluetooth audio device at this time is very small, there will be a limit to the volume change of adjusting the tTV, and the range of volume change is small, so the user further needs to manually adjust the volume of the Bluetooth audio device, which results in a poor user experience. In addition, when the volume of the Bluetooth audio device is at the maximum value (max), after the TV is connected to the Bluetooth audio device, adjusting the volume gain of the TV through the volume key is prone to cause a distortion.

This embodiment provides a solution that can simultaneously and evenly adjust the volume of the smart terminal (such as a TV) and the Bluetooth, so as to achieve a smooth and uniform volume adjustment effect, and to solve the problems of Bluetooth volume adjustment such as distortion, small variation in volume adjustment in the prior art.

Specifically, after the smart terminal is connected with the Bluetooth audio device, the ID of the Bluetooth audio device is recorded, the adjustable maximum volume value $B_{Volmax}$ of the Bluetooth audio device is obtained through the Bluetooth protocol, and the user adjustable maximum volume value on the setting menu displayed on the screen of the smart terminal is obtained simultaneously, which is the adjustable maximum volume value set by the user key, the above two volume values are recorded.

S102, obtaining a volume value indicated by a volume adjustment instruction, after receiving the volume adjustment instruction;

The user may perform volume adjustment through a remote control or a local button panel of the smart terminal to trigger a volume adjustment instruction, after receiving the volume adjustment instruction, the smart terminal obtains the volume value indicated by the volume adjustment instruction, that is, the volume value $Vol_c$ displayed by the smart terminal.

S103, calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, and the user adjustable maximum volume value;

Afterwards, according to the set mapping formulas, the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, the user adjustable maximum volume value.

The set mapping formulas can be as follows:

When the volume is adjusted, the volume gain value $Vol_{Gc}$ of the mapping television bottom is calculated through the volume value of the menu based on the Formula 1 below, that is, the volume value of the smart terminal.

$$Vol_{Gc}=k*Vol_c; \quad \text{Formula 1:}$$

$Vol_c$: the set volume value currently displayed on the menu, i.e., the volume value indicated by the volume adjustment instruction;

$Vol_{max}$: can be set 100 (the user adjustable maximum volume value on the menu);

$Vol_{Gc}$: the current television volume gain value of the mapping bottom needed to set, that is, the volume value of the smart terminal;

k: a factor(a slope factor), its size depends on the maximum volume gain value supported by the TV DSP, if the default is 100, then k=1.

Figure 2:
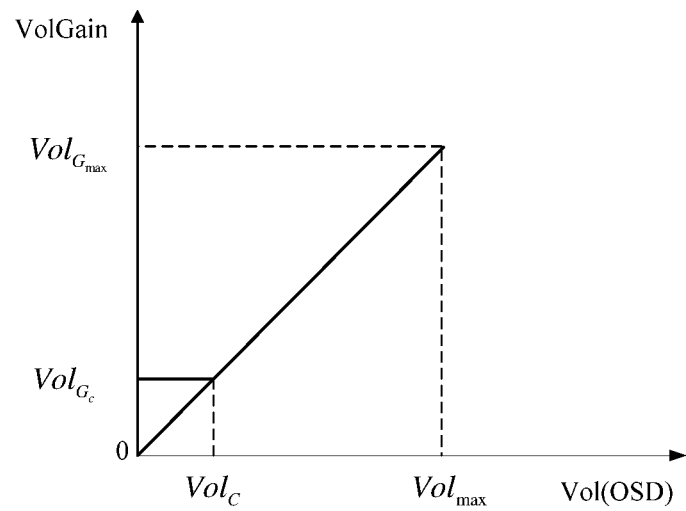
FIG. 2 is a mapping relationship between a current gain value of a television volume and a currently set volume value displayed on a menu in an embodiment of the present disclosure.

The mapping relationship can be obtained based on Formula 1, as referring in FIG. 2.

In FIG. 2, VolGain is the volume gain value of the smart terminal, $Vol_{max}$ is the maximum volume gain value supported to set by the TV DSP; Vol (OSD) is the set volume value displayed on the menu of the television screen.

According to the mapping relationship between the current television volume gain value and the currently set volume value displayed on the menu shown in FIG. 2, when the volume is adjusted, the volume gain value $Vol_{Gc}$ of the mapping television bottom, that is, the volume value of the smart terminal.

In addition, when adjusting the volume, the adjustable maximum volume value $B_{Volmax}$ of the Bluetooth audio device is read, the volume value $B'_{Volc}$ of the Bluetooth audio device to be set to the Bluetooth audio device is calculated according to the following Formula 2.

$$B'_{Volc} = \frac{lg(1+Vol_C)}{lg(1+Vol_{max})} * B_{Volmax}; \quad \text{Formula 2}$$

Volc: the current set volume value displayed on the menu, that is, the volume value indicated by the volume adjustment instruction;

Volmax: can be set 100 (the user adjustable maximum volume value on the menu);

$B_{Volmax}$: the adjustable maximum volume value of the Bluetooth audio device.

Figure 3:
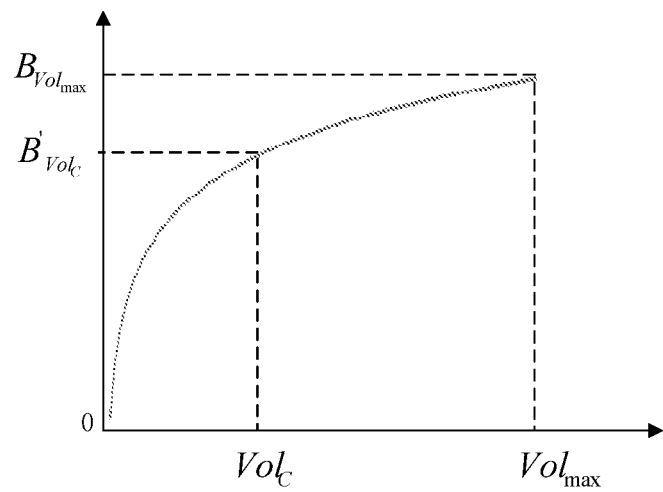
FIG. 3 is a mapping relationship between a volume value of a Bluetooth audio device and a currently set volume value displayed on a menu in an embodiment of the present disclosure.

The mapping relationship referred in FIG. 3 can be obtained based on Formula 2.

Adjusting the volume according to the mapping relationship shown in FIG. 3 can increase the television volume quickly and is a smooth adjustment.

S104, setting the volume of the Bluetooth audio device according to the obtained volume value of the Bluetooth audio device, setting the volume of the smart terminal according to the obtained volume value of the smart terminal.

Afterwards, according to the received volume key trigger information, the corresponding calculated menu television gain value $Vol_{Gc}$ and the volume $B'_{Volc}$ of the Bluetooth audio device are respectively set.

In specific settings, the following solutions can be carried out:

When the Volume Up button is pressed, invoke TV_Set_Volume_Gain ($Vol_{Gc}$) and Send_BT_Volume (ID, $B'_{Volc}$, VolumeUp), (wherein, ID: the Bluetooth audio device ID is connected, the interface is implemented in the code, and the third parameter (the third parameter VolumeUp in the aforementioned parenthesis) is sent to the SNK end through the Bluetooth protocol, this parameter is reserved for adjusting the absolute volume, i.e. if the second parameter (the second parameter $B'_{Vol}$ in the aforementioned parenthesis) is null, then the volume is increased or decreased the volume based on the third parameter);

When the Volume Down button is pressed, invoke TV_Set_Volume_Gain ($Vol_{Gc}$) and Send_BT_Volume (ID, $B'_{Volc}$, VolumeDown), the gain value of the television and the volume value of the Bluetooth audio device are set respectively.

Subsequently, when the volume adjustment instruction from user is received again, return to perform the block of: obtaining the volume value indicated by the volume adjustment instruction, and adjust the volume of the television and the Bluetooth audio device according to the above calculation method.

In the embodiment the adjustable maximum volume value of the Bluetooth audio device and the user adjustable maximum volume value are obtained, after the smart terminal being connected with the Bluetooth audio device; the volume value indicated by the volume adjustment instruction is obtained, after receiving the volume adjustment instruction; the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, and the user adjustable maximum volume value; and the volume of the Bluetooth audio device is set according to the obtained volume value of the Bluetooth audio device, the volume of the smart terminal is set according to the obtained volume value of the smart terminal. Thus, through the above scheme, adaptive Bluetooth volume value adjustment of both ends are achieved, the volume gain value of the television and the volume of the Bluetooth can be adjusted simultaneously and uniformly through volume keys of remote control or adjusting volume keys of the television by the user, thereby realizing a smooth and uniform volume adjustment effect, and thus the problems of Bluetooth volume adjustment such as distortion, small variation in volume adjustment in the prior art are solved, user experience is improved and the competitiveness of user product is improved.

Figure 4:
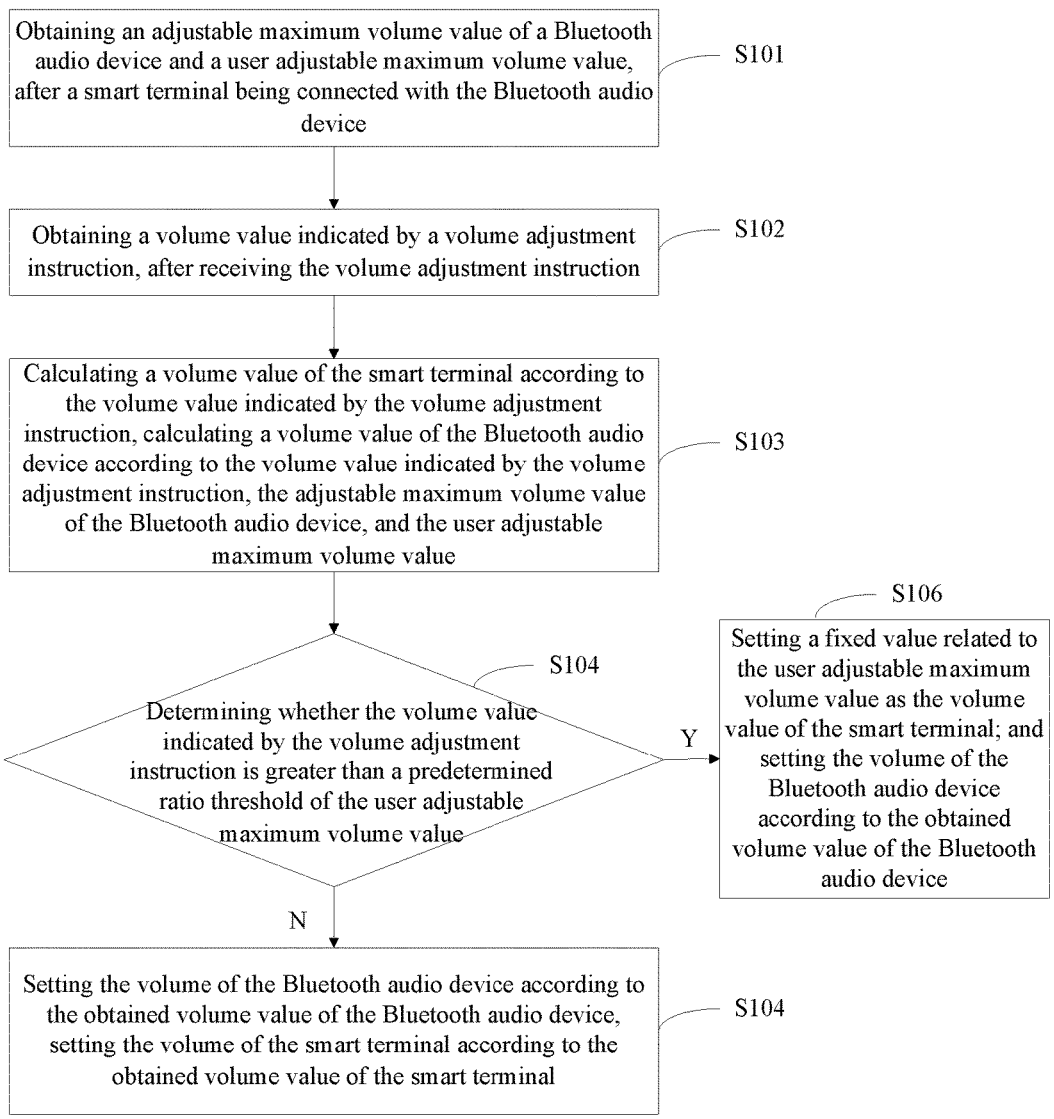
FIG. 4 is a flow chart illustrating a Bluetooth adaptive volume adjusting method according to a second embodiment of the present disclosure.

In addition, in order to avoid that when the Bluetooth audio's sound is set too loud, then adjusting the volume gain of the TV causes volume distortion, as shown in FIG. 4, a second embodiment of the present disclosure provides a Bluetooth adaptive volume adjusting method based on the above embodiment in FIG. 1, prior to the block of "setting the volume of the Bluetooth audio device according to the obtained volume value of the Bluetooth audio device, setting the volume of the smart terminal according to the obtained volume value of the smart terminal", further includes:

S105, determining whether the volume value indicated by the volume adjustment instruction is greater than a predetermined ratio threshold of the user adjustable maximum volume value; if yes, the process proceeds to S106, otherwise, S104 is performed.

S106, setting a fixed value related to the user adjustable maximum volume value as the volume value of the smart terminal; and setting the volume of the Bluetooth audio device according to the obtained volume value of the Bluetooth audio device.

Compared to the above embodiment, in this embodiment, when setting the volume value of the smart terminal, it is considered whether the volume value set by the user's key is too large, a predetermined ratio threshold may be set, whether the volume value indicated by the volume adjustment instruction is greater than a predetermined ratio threshold of the user adjustable maximum volume value is determined, for example, whether the volume value is greater than half of the user adjustable maximum volume value, if yes, the volume value of the smart terminal is set to a fixed value related to the user adjustable maximum volume value, that is, determining $Vol_c$ on the menu is greater than $$\frac{Vol_{max}}{2},$$

if so, the volume value of the smart terminal is set to a fixed value, that is $$Vol_{G_c} = k * \frac{Vol_{max}}{2},$$

to avoid that when the Bluetooth audio's sound is set too loud, then adjusting the volume gain of the television causes volume distortion.

Wherein, k: a factor (a slope factor), its size depends on the maximum volume gain value supported by the TV DSP, if the default is 100, then k=1.

In addition, the volume of the Bluetooth audio device can be set according to the obtained volume value of the Bluetooth audio device.

Figure 5:
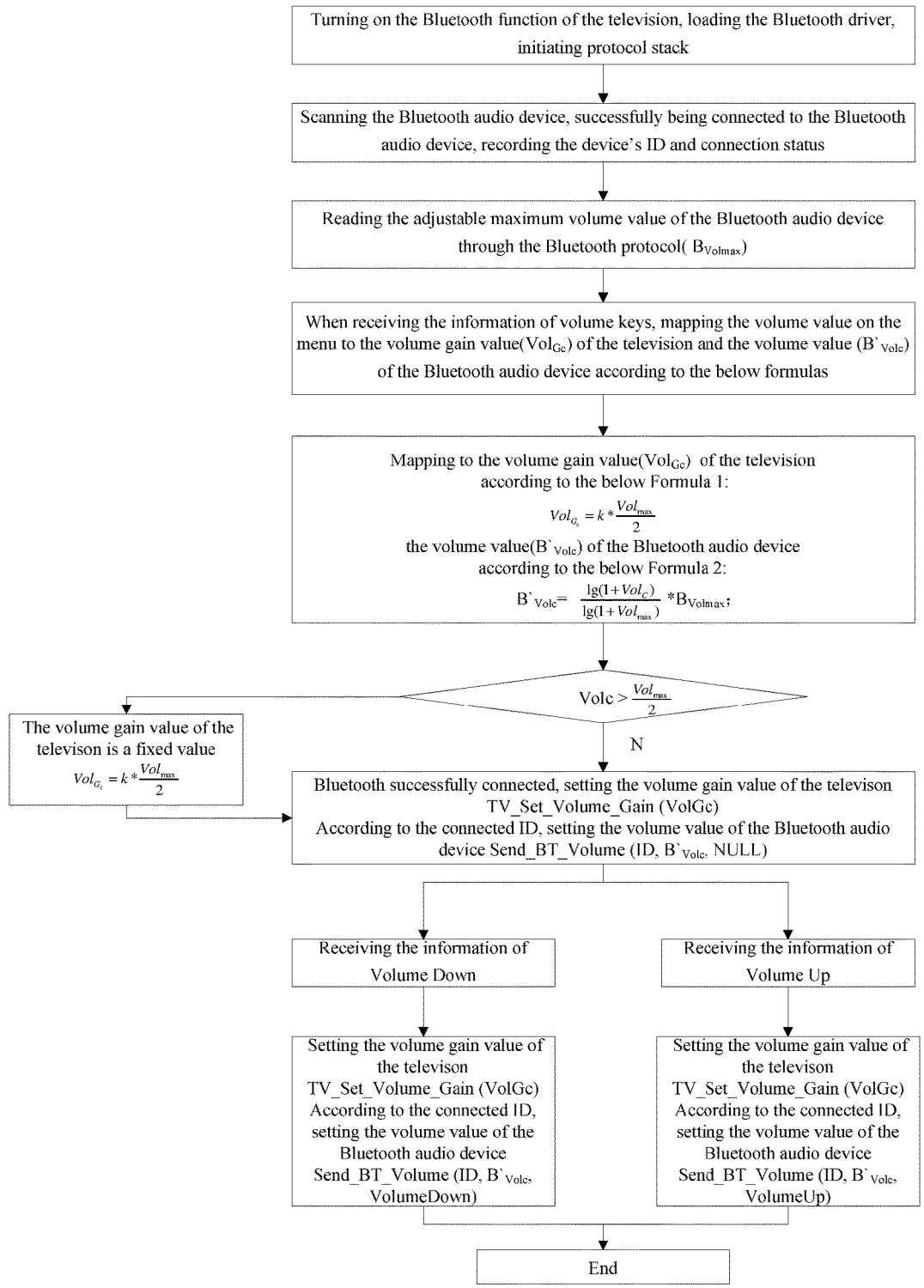
FIG. 5 is a detailed flow chart illustrating a Bluetooth adaptive volume adjusting method according to an embodiment of the present disclosure.

The following describes the solution of the embodiment of the present disclosure in detail with reference to FIG. 5:

Step 1: turning on the Bluetooth function of the television, loading the Bluetooth driver, scanning the Bluetooth audio device, selecting the Bluetooth audio device from the scanned Bluetooth audio devices, establishing a connection, after the connection is successful, recording the device's ID and connection status connect status (1: connected successfully; 0: not connected).

Step 2: after the television is successfully connected to the Bluetooth audio device, the adjustable maximum volume value $B_{Volmax}$ of the currently connected Bluetooth audio device is read through the Bluetooth protocol and recorded. The volume value $Vol_c$ displayed on the menu is read.

Step 3: when the user operates the volume keys, according to the above Formulas 1 and 2, the volume value on the menu is mapped to the volume gain value $Vol_{G_c}$ of the television and the volume value $B'_{Volc}$ of the Bluetooth audio device. Simultaneously the volume gain value (Gain) of the TV DSP Bluetooth volume channel and the volume value of the Bluetooth audio device are respectively adjusted.

Step 4: determining $Vol_c$ on the menu is greater than $$\frac{Vol_{max}}{2},$$

if so, the volume value of the smart terminal is set to a fixed value, that is $$Vol_{G_c} = k * \frac{Vol_{max}}{2};$$

this is to avoid that when the Bluetooth audio's sound is set too loud, then adjusting the volume gain of the television causes volume distortion.

Step 5: according to the received volume key trigger information, the corresponding menu television gain value $Vol_{G_c}$ and the volume $B'_{Volc}$ of the Bluetooth audio device calculated in the above steps are respectively set. That is, when the Volume Up button is pressed, invoke TV_Set_Volume_Gain ($Vol_{G_c}$) and Send_BT_Volume (ID, $B'_{Volc}$, VolumeUp); when the Volume Down button is pressed, invoke TV_Set_Volume_Gain ($Vol_{G_c}$) and Send_BT_Volume (ID, $B'_{Volc}$, VolumeDown), the gain value of the television and the volume value of the Bluetooth audio device are set respectively.

In the embodiment, the adjustable maximum volume value of the Bluetooth audio device and the user adjustable maximum volume value are obtained, after the smart terminal being connected with the Bluetooth audio device; the volume value indicated by the volume adjustment instruction is obtained, after receiving the volume adjustment instruction; the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, the user adjustable maximum volume value; and the volume of the Bluetooth audio device is set according to the obtained volume value of the Bluetooth audio device, the volume of the smart terminal is set according to the obtained volume value of the smart terminal. Thus, through the above scheme, adaptive Bluetooth volume value adjustment of both ends are achieved, the volume gain value of the television and the volume of the Bluetooth can be adjusted simultaneously and uniformly through volume keys of remote control or adjusting volume keys of the television by the user, thereby realizing a smooth and uniform volume adjustment effect, and thus the problems of Bluetooth volume adjustment such as distortion, small variation in volume adjustment in the prior art are solved, user experience is improved and the competitiveness of user product is improved. Moreover, the present disclosure can reduce the investment of equipment personnel in the television production process and realize automatic production.

Correspondingly, an embodiment of a Bluetooth adaptive volume adjusting device is provided.

Figure 6:
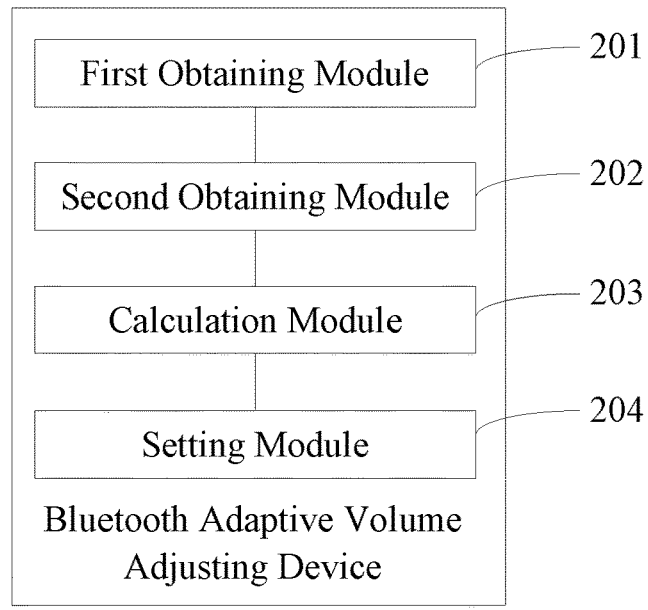
FIG. 6 is a block diagram illustrating a Bluetooth adaptive volume adjusting device according to a first embodiment of the present disclosure.

Referring to FIG. 6, a Bluetooth adaptive volume adjusting device is provided in a first embodiment of the present disclosure, which includes: a first obtaining module 201, a second obtaining module 202, a calculation module 203, and a setting module 204, wherein, a first obtaining module 201, configured to obtain an adjustable maximum volume value of a Bluetooth audio device and a user adjustable maximum volume value after a smart terminal being connected with the Bluetooth audio device;

a second obtaining module 202, configured to obtain a volume value indicated by a volume adjustment instruction after receiving the volume adjustment instruction;

a calculation module 203, configured to calculate a volume value of the smart terminal according to the volume value indicated by the volume adjustment instruction, and to calculate a volume value of the Bluetooth audio device according to the volume value indicated by the volume adjustment instruction, the adjustable maximum volume value of the Bluetooth audio device, the user adjustable maximum volume value; and a setting module 204, configured to set the volume of the Bluetooth audio device according to the obtained volume value of the Bluetooth audio device, and to set the volume of the smart terminal according to the obtained volume value of the smart terminal.

The solution in the embodiment is applicable to an audio playback device using a standard Bluetooth protocol, wherein the smart terminal may be a terminal having audio and video playback functions such as a smart television (TV), an mp3, and a mobile phone. The smart TV is used as an example in this embodiment.

The standard Bluetooth A2dp protocol, the Bluetooth audio device is the SNK (audio sink device), and the TV is the source (audio source device).

Currently, to the smart TV with Bluetooth function, when being successfully connected with Bluetooth audio device in the methods of adjusting Bluetooth volume, if the volume of the Bluetooth audio device at this time is very small, there will be a limit to the volume change of adjusting the tTV, and the range of volume change is small, so the user further needs to manually adjust the volume of the Bluetooth audio device, which results in a poor user experience. In addition, when the volume of the Bluetooth audio device is at the maximum value (max), after the TV is connected to the Bluetooth audio device, adjusting the volume gain of the TV through the volume key is prone to cause a distortion.

This embodiment provides a solution that can simultaneously and evenly adjust the volume of the smart terminal (such as a TV) and the Bluetooth, so as to achieve a smooth and uniform volume adjustment effect, and to solve problems such as distortion, small variation in volume adjustment in the prior art of Bluetooth volume adjustment.

Specifically, after the smart terminal is connected with the Bluetooth audio device, the ID of the Bluetooth audio device is recorded, the adjustable maximum volume value BVolmax of the Bluetooth audio device is obtained through the Bluetooth protocol, and the user adjustable maximum volume value on the setting menu displayed on the screen of the smart terminal is obtained simultaneously, which is the adjustable maximum volume value set by the user key, the above two volume values are recorded.

The user may perform volume adjustment through a remote control or a local button panel of the smart terminal to trigger a volume adjustment instruction, after receiving the volume adjustment instruction, the smart terminal obtains the volume value indicated by the volume adjustment instruction, that is, the volume value $Vol_c$ displayed by the smart terminal.

Afterwards, according to the set mapping formulas, the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, the user adjustable maximum volume value.

The set mapping formulas can be as follows:

When the volume is adjusted, the volume gain value $Vol_{Gc}$ of the mapping television bottom is calculated through the volume value of the menu based on the Formula 1 below, that is, the volume value of the smart terminal.

$$Vol_{Gc} = k * Vol_c;  \quad \text{Formula 1:}$$

$Vol_c$: the set volume value currently displayed on the menu, i.e., the volume value indicated by the volume adjustment instruction;

$Vol_{max}$: can be set 100 (the user adjustable maximum volume value on the menu);

$Vol_{Gc}$: the current television volume gain value of the mapping bottom needed to set, that is, the volume value of the smart terminal;

k: a factor(a slope factor), its size depends on the maximum volume gain value supported by the TV DSP, if the default is 100, then k=1.

The mapping relationship can be obtained based on Formula 1, as referring in FIG. 2.

In FIG. 2, VolGain is the volume gain value of the smart terminal, $Vol_{max}$ is the maximum volume gain value supported to set by the TV DSP; Vol (OSD) is the set volume value displayed on the menu of the television screen.

According to the mapping relationship between the current television volume gain value and the currently set volume value displayed on the menu shown in FIG. 2, when the volume is adjusted, the volume gain value $Vol_{Gc}$ of the mapping television bottom, that is, the volume value of the smart terminal.

In addition, when adjusting the volume, the adjustable maximum volume value $B_{Volmax}$ of the Bluetooth audio device is read, the volume value $B'_{Volc}$ of the Bluetooth audio device to be set to the Bluetooth audio device is calculated according to the following Formula 2.

$$B'_{Volc} = \frac{lg(1 + Vol_C)}{lg(1 + Vol_{max})} * B_{Volmax};  \quad \text{Formula 2}$$

Volc: the current set volume value displayed on the menu, that is, the volume value indicated by the volume adjustment instruction;

Volmax: can be set 100 (the user adjustable maximum volume value on the menu);

$B_{Volmax}$: the adjustable maximum volume value of the Bluetooth audio device.

The mapping relationship referred in FIG. 3 can be obtained based on Formula 2.

Adjusting the volume according to the mapping relationship shown in FIG. 3 can increase the television volume quickly and is a smooth adjustment.

Afterwards, according to the received volume key trigger information, the corresponding calculated menu television gain value $Vol_{Gc}$ and the volume $B'_{Volc}$ of the Bluetooth audio device are respectively set.

In specific settings, the following solutions can be carried out:

When the Volume Up button is pressed, invoke TV_Set_Volume_Gain ($Vol_{Gc}$) and Send_BT_Volume (ID, $B'_{Volc}$, VolumeUp), (wherein, ID: the Bluetooth audio device ID is connected, the interface is implemented in the code, and the third parameter (the third parameter VolumeUp in the aforementioned parenthesis) is sent to the SNK end through the Bluetooth protocol, this parameter is reserved for adjusting the absolute volume, i.e. if the second parameter (the second parameter $B'_{Vol}$ in the aforementioned parenthesis) is null, then the volume is increased or decreased the volume based on the third parameter);

When the Volume Down button is pressed, invoke TV_Set_Volume_Gain (Vol$_{Gc}$) and Send_BT_Volume (ID, B'$_{Volc}$, VolumeDown), the gain value of the television and the volume value of the Bluetooth audio device are set respectively.

Subsequently, when the volume adjustment instruction from user is received again, return to perform the block of: obtaining the volume value indicated by the volume adjustment instruction, and adjust the volume of the television and the Bluetooth audio device according to the above calculation method.

In the embodiment the adjustable maximum volume value of the Bluetooth audio device and the user adjustable maximum volume value are obtained, after the smart terminal being connected with the Bluetooth audio device; the volume value indicated by the volume adjustment instruction is obtained, after receiving the volume adjustment instruction; the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, and the user adjustable maximum volume value; and the volume of the Bluetooth audio device is set according to the obtained volume value of the Bluetooth audio device, the volume of the smart terminal is set according to the obtained volume value of the smart terminal. Thus, through the above scheme, adaptive Bluetooth volume value adjustment of both ends are achieved, the volume gain value of the television and the volume of the Bluetooth can be adjusted simultaneously and uniformly through volume keys of remote control or adjusting volume keys of the television by the user, thereby realizing a smooth and uniform volume adjustment effect, and thus problems of distortion and small variation in volume adjustment in the existing Bluetooth volume adjustment are solved, user experience is improved and the competitiveness of user product is improved.

Figure 7:
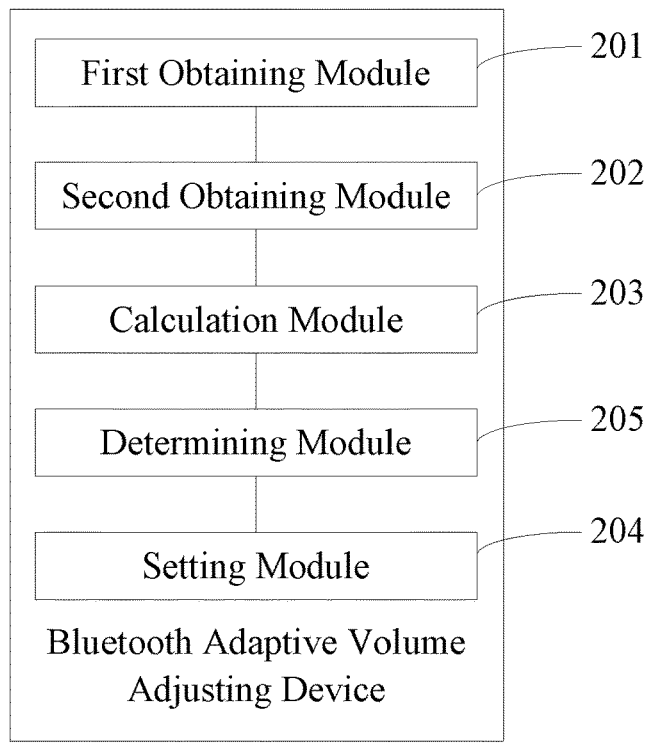
FIG. 7 is a block diagram illustrating a Bluetooth adaptive volume adjusting device according to a second embodiment of the present disclosure.

Referring to FIG. 7, a Bluetooth adaptive volume adjusting device is provided in a second embodiment in the present disclosure, based on the embodiment shown in FIG. 6 above, the device further includes:

a determining module 205, configured to determine whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

Compared to the above embodiment, in this embodiment, when setting the volume value of the smart terminal, it is considered whether the volume value set by the user's key is too large, a predetermined ratio threshold may be set, whether the volume value indicated by the volume adjustment instruction is greater than a predetermined ratio threshold of the user adjustable maximum volume value is determined, for example, whether the volume value is greater than half of the user adjustable maximum volume value, if yes, the volume value of the smart terminal is set to a fixed value related to the user adjustable maximum volume value, that is, determining Vol$_c$ on the menu is greater than $$\frac{Vol_{max}}{2},$$

if so, the volume value of the smart terminal is set to a fixed value, that is $$Vol_{G_c} = k * \frac{Vol_{max}}{2},$$

to avoid that when the Bluetooth audio's sound is set too loud, then adjusting the volume gain of the television causes volume distortion.

Wherein, k: a factor(a slope factor), its size depends on the maximum volume gain value supported by the TV DSP, if the default is 100, then k=1.

In addition, the volume of the Bluetooth audio device can be set according to the obtained volume value of the Bluetooth audio device.

In the embodiment, the adjustable maximum volume value of the Bluetooth audio device and the user adjustable maximum volume value are obtained, after the smart terminal being connected with the Bluetooth audio device; the volume value indicated by the volume adjustment instruction is obtained, after receiving the volume adjustment instruction; the volume value of the smart terminal is calculated according to the volume value indicated by the volume adjustment instruction, the volume value of the Bluetooth audio device is calculated according to the volume value indicated by the volume adjustment instruction, the adjustable maximum volume value of the Bluetooth audio device, the user adjustable maximum volume value; and the volume of the Bluetooth audio device is set according to the obtained volume value of the Bluetooth audio device, the volume of the smart terminal is set according to the obtained volume value of the smart terminal. Thus, through the above scheme, adaptive Bluetooth volume value adjustment of both ends are achieved, the volume gain value of the television and the volume of the Bluetooth can be adjusted simultaneously and uniformly through volume keys of remote control or adjusting volume keys of the television by the user, thereby realizing a smooth and uniform volume adjustment effect, and thus the problems of Bluetooth volume adjustment such as distortion, small variation in volume adjustment in the prior art are solved, user experience is improved and the competitiveness of user product is improved. Moreover, the present disclosure can reduce the investment of equipment personnel in the television production process and realize automatic production.

The foregoing description portrays merely some illustrative embodiments of the present disclosure, and are not intended to limit the patentable scope of the present disclosure. Any equivalent structural or flow transformations based on the specification and the drawing of the present disclosure, or any direct or indirect applications of the present disclosure in other related technical fields, shall all fall within the protection scope of the present disclosure.

What is claimed is:
1. A Bluetooth adaptive volume adjusting method, comprising:
obtaining an adjustable maximum volume value of a Bluetooth audio device and a user adjustable maximum volume value, after a smart terminal being connected with the Bluetooth audio device;

obtaining a volume value indicated by a volume adjustment instruction, after receiving the volume adjustment instruction;

calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, and the user adjustable maximum volume value; and setting the volume of the Bluetooth audio device according to the obtained volume value of the Bluetooth audio device, setting the volume of the smart terminal according to the obtained volume value of the smart terminal;

a formula for calculating the volume value of the Bluetooth audio device according to the volume value indicated by the volume adjustment instruction, the adjustable maximum volume value of the Bluetooth audio device, and the user adjustable maximum volume value being as follows:

$$B'_{Volc} = \frac{lg(1+Vol_C)}{lg(1+Vol_{max})} * B_{Volmax};$$

in which $Vol_c$ is the volume value indicated by the volume adjustment instruction;

$Vol_{max}$ is the user adjustable maximum volume value;

$B_{Volmax}$ is the adjustable maximum volume value of the Bluetooth audio device;

$B'_{Volc}$ is the volume value of the Bluetooth audio device.

2. The method of claim 1, prior to "setting the volume of the Bluetooth audio device according to the obtained volume value of the Bluetooth audio device, setting the volume of the smart terminal according to the obtained volume value of the smart terminal", further comprising:

determining whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

3. The method of claim 2, wherein "setting the volume of the Bluetooth audio device according to the obtained volume value of the Bluetooth audio device, setting the volume of the smart terminal according to the obtained volume value of the smart terminal" comprises:

invoking an interface TV_Set_Volume_Gain, and setting the volume of the smart terminal according to the obtained volume value of the smart terminal; invoking an interface Send_BT_Volume, and setting the volume of the Bluetooth audio device according to the obtained volume value of the Bluetooth audio device.

4. The method of claim 1, further comprising:

when receiving the volume adjustment instruction again, returning to perform: obtaining the volume value indicated by the volume adjustment instruction.

5. The method of claim 4, wherein "setting the volume of the Bluetooth audio device according to the obtained volume value of the Bluetooth audio device, setting the volume of the smart terminal according to the obtained volume value of the smart terminal" comprises:

invoking an interface TV_Set_Volume_Gain, and setting the volume of the smart terminal according to the obtained volume value of the smart terminal; invoking an interface Send_BT_Volume, and setting the volume of the Bluetooth audio device according to the obtained volume value of the Bluetooth audio device.

6. The method of claim 1, wherein "setting the volume of the Bluetooth audio device according to the obtained volume value of the Bluetooth audio device, setting the volume of the smart terminal according to the obtained volume value of the smart terminal" comprises:

invoking an interface TV_Set_Volume_Gain, and setting the volume of the smart terminal according to the obtained volume value of the smart terminal; invoking an interface Send_BT_Volume, and setting the volume of the Bluetooth audio device according to the obtained volume value of the Bluetooth audio device.

7. A Bluetooth adaptive volume adjusting method, comprising:

obtaining an adjustable maximum volume value of a Bluetooth audio device and a user adjustable maximum volume value, after a smart terminal being connected with the Bluetooth audio device;

obtaining a volume value indicated by a volume adjustment instruction, after receiving the volume adjustment instruction;

calculating a volume value of the smart terminal according to the volume value indicated by the volume adjustment instruction, calculating a volume value of the Bluetooth audio device according to the volume value indicated by the volume adjustment instruction, the adjustable maximum volume value of the Bluetooth audio device, and the user adjustable maximum volume value; and setting the volume of the Bluetooth audio device according to the obtained volume value of the Bluetooth audio device, setting the volume of the smart terminal according to the obtained volume value of the smart terminal; wherein, a formula for calculating the volume value of the smart terminal according to the volume value indicated by the volume adjustment instruction is as follows:

$$Vol_{Gc} = k * Vol_c;$$

in which $Vol_c$ is the volume value indicated by the volume adjustment instruction;

$Vol_{Gc}$ is the volume value of the smart terminal;

k is a slope factor;

a formula for calculating the volume value of the Bluetooth audio device according to the volume value indicated by the volume adjustment instruction, the adjustable maximum volume value of the Bluetooth audio device, and the user adjustable maximum volume value is as follows:

$$B'_{Volc} = \frac{lg(1+Vol_C)}{lg(1+Vol_{max})} * B_{Volmax};$$

in which $Vol_c$ is the volume value indicated by the volume adjustment instruction;

$Vol_{max}$ is the user adjustable maximum volume value;

$B_{Volmax}$ is the adjustable maximum volume value of the Bluetooth audio device;

$B'_{Volc}$ is the volume value of the Bluetooth audio device.

8. The method of claim 7, prior to "setting the volume of the Bluetooth audio device according to the obtained volume value of the Bluetooth audio device, setting the volume of the smart terminal according to the obtained volume value of the smart terminal", further comprising:

determining whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

9. The method of claim 7, further comprising:

when receiving the volume adjustment instruction again, returning to perform: obtaining the volume value indicated by the volume adjustment instruction.

10. The method of claim 7, wherein "setting the volume of the Bluetooth audio device according to the obtained volume value of the Bluetooth audio device, setting the volume of the smart terminal according to the obtained volume value of the smart terminal" comprises:

invoking an interface TV_Set_Volume_Gain, and setting the volume of the smart terminal according to the obtained volume value of the smart terminal; invoking an interface Send_BT_Volume, and setting the volume of the Bluetooth audio device according to the obtained volume value of the Bluetooth audio device.

11. A Bluetooth adaptive volume adjusting device, comprising one or more processors and a non-transitory program storage medium storing program code executable by the one or more processors, the program code comprising:

a first obtaining module, configured to obtain an adjustable maximum volume value of a Bluetooth audio device and a user adjustable maximum volume value after a smart terminal being connected with the Bluetooth audio device;

a second obtaining module, configured to obtain a volume value indicated by a volume adjustment instruction after receiving the volume adjustment instruction;

a calculation module, configured to calculate a volume value of the smart terminal according to the volume value indicated by the volume adjustment instruction, and to calculate a volume value of the Bluetooth audio device according to the volume value indicated by the volume adjustment instruction, the adjustable maximum volume value of the Bluetooth audio device, and the user adjustable maximum volume value; and a setting module, configured to set the volume of the Bluetooth audio device according to the obtained volume value of the Bluetooth audio device, and to set the volume of the smart terminal according to the obtained volume value of the smart terminal; wherein, a formula for calculating the volume value of the smart terminal according to the volume value indicated by the volume adjustment instruction is as follows:

$Vol_{Gc} = k * Vol_c$;

in which $Vol_c$ is the volume value indicated by the volume adjustment instruction;

$Vol_{Gc}$ is the volume value of the smart terminal;

k is a slope factor;

a formula for calculating the volume value of the Bluetooth audio device according to the volume value indicated by the volume adjustment instruction, the adjustable maximum volume value of the Bluetooth audio device, and the user adjustable maximum volume value is as follows:

$$B'_{Volc} = \frac{lg(1 + Vol_C)}{lg(1 + Vol_{max})} * B_{Volmax};$$

in which $Vol_c$ is the volume value indicated by the volume adjustment instruction;

$Vol_{max}$ is the user adjustable maximum volume value;

$B_{Volmax}$ is the adjustable maximum volume value of the Bluetooth audio device;

$B'_{Volc}$ is the volume value of the Bluetooth audio device.

12. The device of claim 11, the program code further comprising:

a determining module, configured to determine whether the volume value indicated by the volume adjustment instruction is greater than a predetermined ratio threshold of the user adjustable maximum volume value; if yes, then setting a fixed value related to the user adjustable maximum volume value as the volume value of the smart terminal; otherwise, performing the block of: setting the volume of the Bluetooth audio device according to the obtained volume value of the Bluetooth audio device, setting the volume of the smart terminal according to the obtained volume value of the smart terminal.

13. The device of claim 12, wherein the setting module is also configured to invoke an interface TV_Set_Volume_Gain, and set the volume of the smart terminal according to the obtained volume value of the smart terminal; and configured to invoke an interface Send_BT_Volume, and set the volume of the Bluetooth audio device according to the obtained volume value of the Bluetooth audio device.

14. The device of claim 11, wherein the second obtaining module is further configured to obtain the volume value indicated by the volume adjustment instruction again when receiving the volume adjustment instruction once more.

15. The device of claim 14, wherein the setting module is also configured to invoke an interface TV_Set_Volume_Gain, and set the volume of the smart terminal according to the obtained volume value of the smart terminal; and configured to invoke an interface Send_BT_Volume, and set the volume of the Bluetooth audio device according to the obtained volume value of the Bluetooth audio device.

16. The device of claim 11, wherein the setting module is also configured to invoke an interface TV_Set_Volume_Gain, and set the volume of the smart terminal according to the obtained volume value of the smart terminal; and configured to invoke an interface Send_BT_Volume, and set the volume of the Bluetooth audio device according to the obtained volume value of the Bluetooth audio device.

* * * * *